United States Patent
Hecht (10) Patent No.: US 10,112,242 B1
(45) Date of Patent: Oct. 30, 2018

(54) RAMPING INSERT HAVING NON-POSITIVE CUTTING GEOMETRY AND RAMPING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 90 days.

(21) Appl. No.: 15/493,274

(22) Filed: Apr. 21, 2017

(51) Int. Cl.
*B23C 5/20* (2006.01)
*B23C 5/22* (2006.01)

(52) U.S. Cl.
CPC .... *B23C 5/2221* (2013.01); *B23C 2200/0494* (2013.01); *B23C 2200/085* (2013.01); *B23C 2200/125* (2013.01); *B23C 2200/286* (2013.01)

(58) Field of Classification Search
CPC .......... B23C 5/2221; B23C 2200/0444; B23C 2200/0433; B23C 2200/08; B23C 2200/085; B23C 2200/125; B23C 2200/367; B23C 2200/208; B23C 2210/24; B23C 2210/241; B23C 2210/04
See application file for complete search history.

(56) References Cited

U.S. PATENT DOCUMENTS

| | | | |
|---|---|---|---|
| 5,333,972 A * | 8/1994 | Bernadic | B23B 27/141 407/113 |
| 6,238,146 B1 * | 5/2001 | Satran | B23B 27/1614 407/113 |
| 6,921,233 B2 | 7/2005 | Duerr et al. | |
| 7,073,987 B2 | 7/2006 | Hecht | |
| 7,094,007 B2 | 8/2006 | Satran et al. | |
| 7,104,736 B2 | 9/2006 | Satran et al. | |
| 7,241,082 B2 * | 7/2007 | Smilovici | B23C 5/2221 407/113 |
| 7,246,973 B2 | 7/2007 | Johnson et al. | |
| 7,560,068 B2 | 7/2009 | Smilovici et al. | |

(Continued)

FOREIGN PATENT DOCUMENTS

| | | |
|---|---|---|
| JP | 5779830 B2 | 9/2015 |
| WO | WO 2008/093931 | 8/2008 |
| WO | WO 2016/147493 A1 | 9/2016 |

OTHER PUBLICATIONS

International Search Report dated Jul. 17, 2018, issued in PCT counterpart application (No. PCT/IL2018/050341).

(Continued)

*Primary Examiner* — Will Fridie, Jr.
(74) *Attorney, Agent, or Firm* — Womble Bond Dickinson (US) LLP (57) ABSTRACT

A double-sided, indexable, non-positive ramping insert has a 180-degree rotational symmetry about each of the first, second and third axes of a three-dimensional Euclidean space. The ramping insert includes two first surfaces and an insert peripheral surface which extends therebetween. The ramping insert includes four cutting portions, each includes a major cutting edge, a wiper edge connected transversely thereto via a corner cutting edge and a ramping edge which extends transversely from the wiper edge in a view parallel to the first axis. Each peripheral surface includes four non-positive ramping relief surfaces, each of which extends from a respective ramping edge towards, and not beyond, a first median plane which is defined by the second and third axes.

34 Claims, 4 Drawing Sheets

(56) References Cited

U.S. PATENT DOCUMENTS

| | | | | |
|---|---|---|---|---|
| 8,449,230 | B2* | 5/2013 | Nguyen | B23C 5/109 |
| | | | | 407/113 |
| 8,753,045 | B2 | 6/2014 | Hecht | |
| 9,981,323 | B2* | 5/2018 | Fang | B23C 5/08 |
| 10,046,398 | B2* | 8/2018 | Agic | B23B 27/1662 |
| 2005/0063792 | A1 | 3/2005 | Satran | |
| 2006/0045636 | A1 | 3/2006 | Johnson et al. | |
| 2008/0273931 | A1* | 11/2008 | Spitzenberger | B23C 5/202 |
| | | | | 407/51 |
| 2011/0129309 | A1 | 6/2011 | Kovac et al. | |
| 2013/0108388 | A1* | 5/2013 | Ishi | B23C 5/109 |
| | | | | 409/132 |
| 2015/0183034 | A1* | 7/2015 | Stark | B23C 5/109 |
| | | | | 407/48 |

OTHER PUBLICATIONS

Written Opinion dated Jul. 17, 2018, issued in PCT counterpart application (No. PCT/IL2018/050341).

* cited by examiner

RAMPING INSERT HAVING NON-POSITIVE CUTTING GEOMETRY AND RAMPING TOOL

FIELD OF THE INVENTION

The subject matter of the present application relates to ramping tools. Specifically, it relates to milling, or ramping, inserts with ramping cutting edges.

BACKGROUND OF THE INVENTION

U.S. Pat. No. 7,241,082 discloses an insert from the general field of milling, which does not include ramping cutting edges or ramping abilities. The ramping insert has almost no ground surfaces. In other words, the ramping insert is pressed-to-size, which also means that all edges, including the cutting edges, are pressed accurately enough, such that grinding is not required.

As will be explained below, aside from the above pressed-to-size advantage, the pressing method includes dies/molds/punches movement only along a single axis. Specifically, there is used a split die method as disclosed in U.S. Pat. No. 7,560,068. This single-axis type pressing method enables a low number of die/punch parts, increases production simplicity and therefore considerably lowers productions costs. As will be explained below, these abovementioned advantages are maintained, while introducing a new feature combination and geometry, which enables ramping capabilities for the known ramping insert.

SUMMARY OF THE INVENTION

In accordance with a first aspect of the subject matter of the present application there is provided a double-sided, indexable, non-positive ramping insert having a 180-degree rotational symmetry about each of the first, second and third axes of a three-dimensional Euclidean space, a first median plane defined by the second and third axes, a second median plane YP defined by the first and third axes, and a third median plane defined by the first and second axes, the ramping insert comprising two first surfaces located on opposite sides of the first median plane, and an insert peripheral surface extending between the first surfaces and intersecting each first surface at a peripheral edge, each first surface comprising two raised corners and two lowered corners, the raised corners being farther from the first median plane than the lowered corners;

the insert peripheral surface comprising two second surfaces and two third surfaces extending therebetween, each first surface comprising exactly two opposite cutting portions, each cutting portion comprising:
  a major cutting edge formed at an intersection of the first and second surfaces;
  a corner cutting edge at one of the raised corners, and
  a wiper edge connected to the major cutting edge via the corner cutting edge;
wherein,
  each cutting portion further comprises a ramping edge extending transversely from the wiper edge in a view parallel to the first axis; and
  each third surface comprises only two non-positive ramping relief surfaces, each ramping relief surface extending from a respective ramping edge towards, but not beyond, the first median plane.

In accordance with a third aspect of the subject matter of the present application there is further provided a ramping tool having opposite machining and coupling ends, wherein the machining end comprises a pocket and the ramping insert coupled therein.

Any of the following features, either alone or in combination, may be applicable to any of the above aspects of the subject matter of the application:

On each first surface, each ramping edge of a first cutting portion is connected to a major cutting edge of a second cutting portion via a minor corner edge.

In each peripheral edge, each minor corner edge is located closer to the first median plane than any of the major corner edges.

On each first surface, the minor corner edges are closer to a third median plane defined by the first and second axes than the corner cutting edge.

In a view parallel to the first axis, the ramping edge is at least partially spaced apart from an intersection line formed between the first median plane and the third surface.

In a view parallel to the first axis, every point of the third surfaces located on the near side of the first median plane is either visible or coincides with the peripheral edge closer to the point of view.

A clamping hole extends between, and opens out to, either the first or second surfaces.

Each first surface comprises a first abutment surface which is parallel to the first median plane.

Each first surface can include first abutment sub-surfaces which are transverse to the first median plane.

Each second surface can include a planar second abutment surface which is parallel to a second median plane defined by the first and third axes.

Each third surface can include a planar third abutment surface which is parallel to a third median plane defined by the first and second axes.

Each second surface comprises two major relief surfaces, each extending from an associated major cutting edge, transversely to a second median plane defined by the first and third axes.

Each third surface comprises two wiper relief surfaces, each of which extends from an associated wiper edge towards the first median plane.

Each third surface includes wiper relief surfaces which extend towards the first median plane from respective wiper edges, and a third abutment surface which extends between the wiper relief surfaces. The wiper relief surfaces may constitute non-ground surfaces.

Each ramping relief surface is either perpendicular or forms an acute internal ramping relief angle with a third median plane defined by the first and second axes.

Each third surface comprises wiper relief surfaces which extend towards the first median plane from respective wiper edges; and wherein the wiper relief surface and the ramping relief surface are not co-planar.

In a view parallel to the first axis, when proceeding along the ramping edge starting from the wiper edge, each successive point is located closer to a third median plane, defined by the first and second axes, than the one before it.

In a view parallel to the first axis, the ramping edge appears straight and forms an acute ramping angle with a third median plane defined by the first and second axes.

The ramping edge is continuous.

A second median plane is defined by the first and third axes and a third median plane is defined by the first and second axes, and wherein in any cross section of any of the third surfaces taken parallel to the second median plane, when proceeding along each third surface away from the first median plane, each successive point is located either at the same distance from, or closer to, the third median plane with respect to a point before it.

A second median plane is defined by the first and third axes and third median plane is defined by the first and second axes, and wherein in any cross section of any of the second surfaces taken parallel to the third median plane, when proceeding along each second surface away from the first median plane, each successive point is located either at the same distance from, or closer to, the second median plane with respect to a point before it.

The major cutting edge is longer than the ramping edge and the ramping edge is longer than wiper edge.

The ramping insert has at least a 180-degree cutting edge rotational symmetry.

The rotational symmetry doesn't include non-functional geometry.

The rotational symmetry doesn't include chip breaking or deflecting surfaces.

The ramping insert is configured for milling exactly 90 degrees shoulder in a workpiece.

In a view parallel to the first axis, a straight tangent line which is tangent to any point of the ramping edge forms a ramping angle which is smaller than 20 degrees with the third median plane.

When proceeding along the ramping edge away from the wiper edge, the ramping edge increases proximity to the first median plane.

Each pocket can include a second pocket abutment surface with a threaded screw hole which opens out thereto; first and third pocket abutment surfaces extending transversely away from the first pocket abutment surface; and a clamping screw configured to clamp the ramping insert in the pocket.

In an assembled position of the ramping tool, the first abutment surface abuts the first pocket abutment surface, the second abutment surface abuts the second pocket abutment surface and the third abutment surface abuts the third pocket abutment surface; and wherein the clamping screw is screw threaded in the screw hole and located in the clamping bore.

BRIEF DESCRIPTION OF THE DRAWINGS

For a better understanding of the subject matter of the present application and to show how the same may be carried out in practice, reference will now be made to the accompanying drawings, in which.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
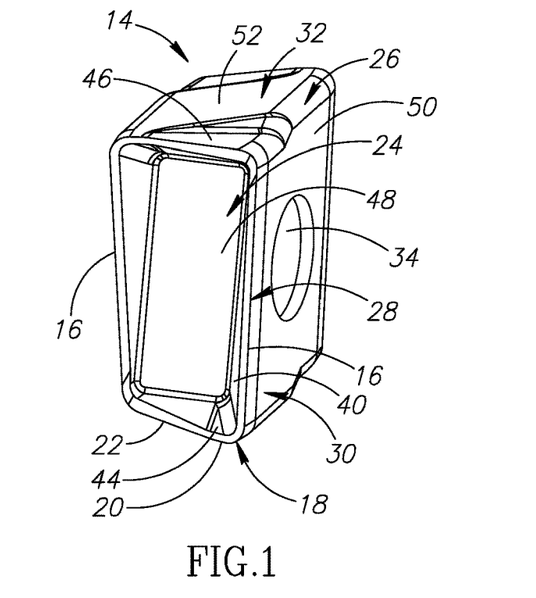
FIG. 1 is an isometric view of a tangential ramping insert.
Figures 6, 7, 8:
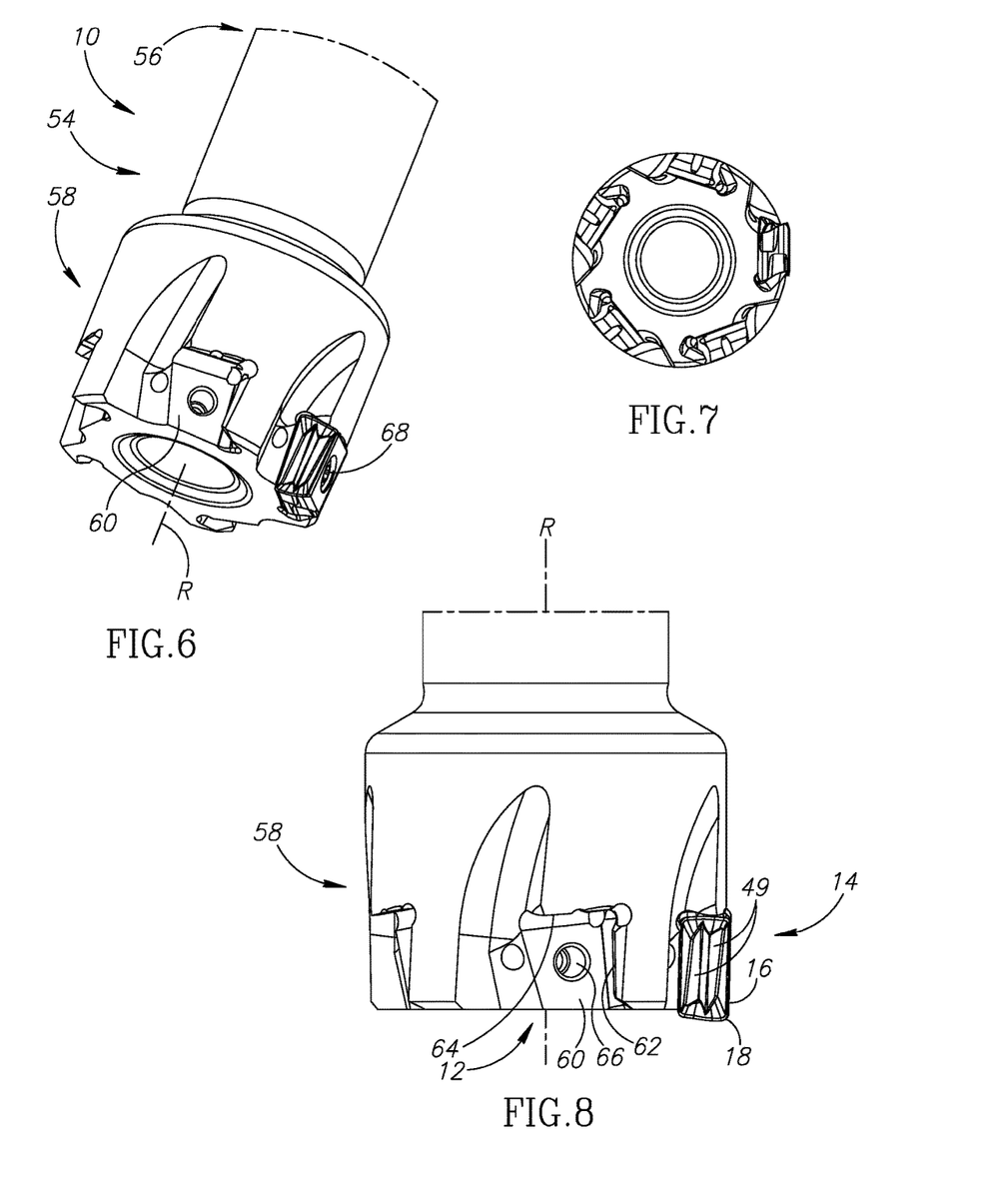
FIG. 6 is an isometric view of a ramping tool with another embodiment of the ramping insert of FIG. 1 secured in a pocket in an assembled position.
FIG. 7 is a side view of the ramping tool of FIG. 6.
FIG. 8 is an axial bottom view of the ramping tool of FIG. 6.

Attention is drawn to FIGS. 1 and 6. A ramping tool 10 includes multiple pockets 12 and ramping inserts 14 secured therein. The ramping insert 14 and ramping tool 10 are configured for milling exactly a 90-degree shoulder (within desired tolerances) in a workpiece as well as performing ramping and wiping operations. The ramping insert 14 therefore includes at least the following operational edges: a major cutting edge 16, a corner cutting edge 18, a wiper edge 20 and a ramping edge 22.

The ramping insert 14 is typically made from extremely hard and wear-resistant material such as cemented carbide by form-pressing and sintering carbide powders in a binder. The cemented carbide may be, for example, tungsten carbide. The ramping insert 14 may be coated or uncoated.

Attention is drawn to FIGS. 1-4. The ramping insert 14 has a 180-degree rotational symmetry about each of the first, second and third axes X, Y, Z of a three-dimensional Euclidean space. This rotational symmetry relates to at least the machining, or operational edges of the ramping insert 14. The ramping insert 14 has a first median plane XP defined by the second and third axes Y, Z, a second median plane YP defined by the first and third axes X, Z and a third median plane ZP defined by the first and second axes X, Y. The ramping insert 14 has at least a 180-degree rotational symmetry about said axes. For example, the ramping insert 14 doesn't have, a 90-degree symmetry about any of said axes.

Said rotational symmetry relates at least to functional machining geometry, such as the ramping edges 22, the corner cutting edges 18, the wiper edges 20 and the major cutting edge 16. For example, some functional features such as cutting edge indication/marking (consecutive) numbers are not included in said rotational symmetry. Said rotational symmetry further does not include, or relates to, non-functional geometry such, e.g., coloring of the ramping insert 14. Furthermore, said rotational symmetry does not necessarily include chip breaking, or deflecting, surfaces.

The ramping insert 14 has two identical first surfaces 24 located on opposite sides of the first median plane XP. Each first surface 24 has two raised corners 18a, and two lowered corners 38a, the raised corners 18a being farther from the first median plane XP than the lowered corners 38a. The ramping insert 14 has an insert peripheral surface 26 which extends between the first surfaces 24. The insert peripheral surface 26 intersects with each first surface 24 at a peripheral edge 28. Each insert peripheral surface 26 includes two second surfaces 30 located on opposite sides of the second median plane YP. The insert peripheral surface 26 further includes two third surfaces 32 which are located on opposite sides of the third median plane ZP. Each third surface 32 extends between the two second surfaces 30. The ramping insert 14 has a clamping hole 34 which extends between, and opens out to, either the two first surfaces 24 (FIG. 1-4), or to the two second surfaces 30 (FIG. 5).

Figure 4:
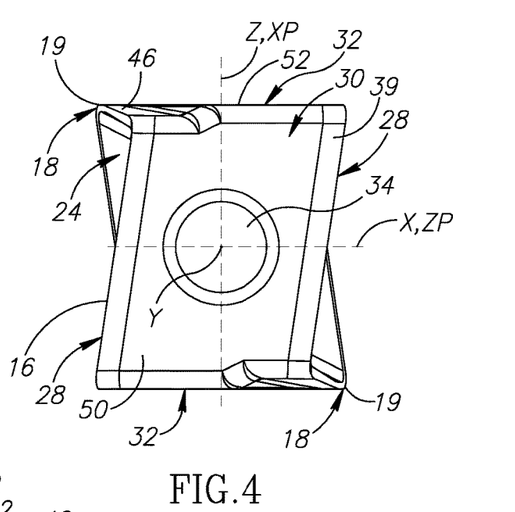
FIG. 4 is a plan view of a second surface of the ramping insert of FIG. 1 showing a clamping hole which opens out thereto.
Figure 5:
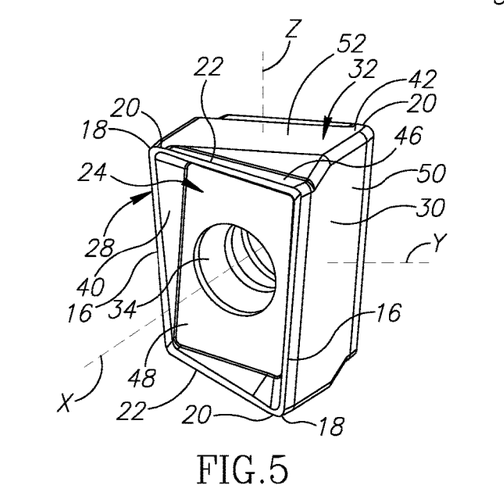
FIG. 5 is an isometric view of a radial embodiment of the ramping insert of FIG. 1 showing the clamping hole opening out to the first surface.
Figure 9:
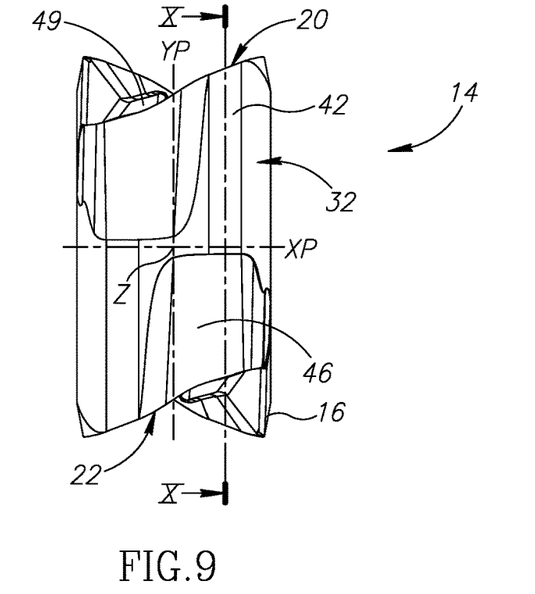
FIG. 9 is a plan view of the third surface of the ramping insert of FIG. 6.
Figure 10:
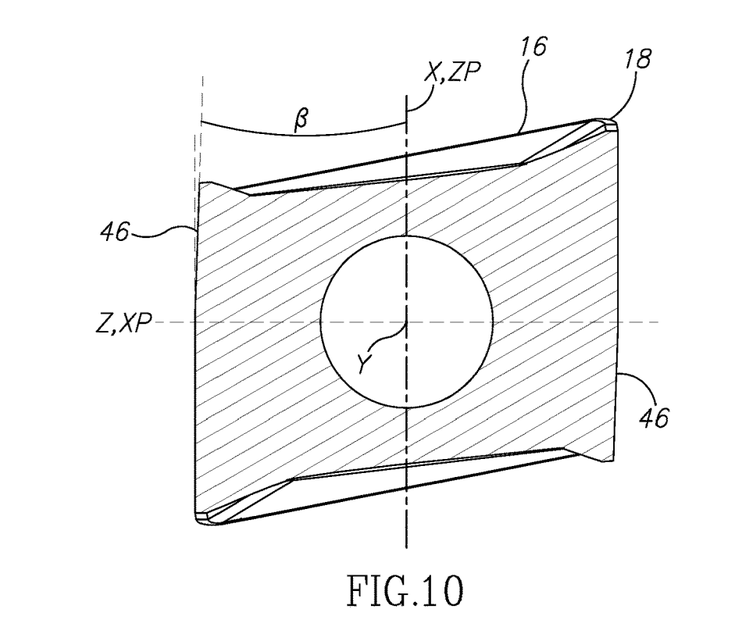
FIG. 10 is a cross-sectional view taken along line X-X of FIG. 9 which passes above a ramping relief surface and a wiper relief surface.

Attention is drawn to FIGS. 4 and 9-10. The ramping insert 14 is indexable, double sided and non-positive. The term non-positive is used in the sense that the ramping insert 14 does not have any positive geometry (such as acute relief angles) and therefore has either a negative structure/form (known as a negative insert in the art), and/or a structure which is the opposite of what is known as a positive structure. Put differently, when proceeding along the second or third surfaces 30, 32, perpendicularly away from the first median plane XP, none of the second or third surfaces 30, 32 extends outwardly away from the second or third median planes YP, ZP respectively. In other words, and as will be further explained below, no relief surface which extends from the peripheral edges 28 forms an obtuse internal angle (measured internally, within the ramping insert 14) with the second or third median planes YP, ZP (only, e.g., right or acute internal angles). During production of the ramping insert 14, once the form-pressing process is complete, the current novel geometry ensures an easy, efficient and reliable extraction of a form-pressed (brittle) green body from a splitting die set which splits at the first median plane XP.

Therefore, in any cross section of the second surface 30 taken parallel to the third median plane ZP, when proceeding away from the first median plane XP, each successive point of the second surface 30 is located at the same distance from, or closer to, the second median plane YP than the point before it. Furthermore, in any cross section of the third surface 32 taken parallel to the second median plane YP (as seen in FIGS. 9 and 10), when proceeding away from the first median plane XP, each successive point of the third surface 32 is located at the same distance from, or closer to, the third median plane ZP than the point before it.

Figure 2:
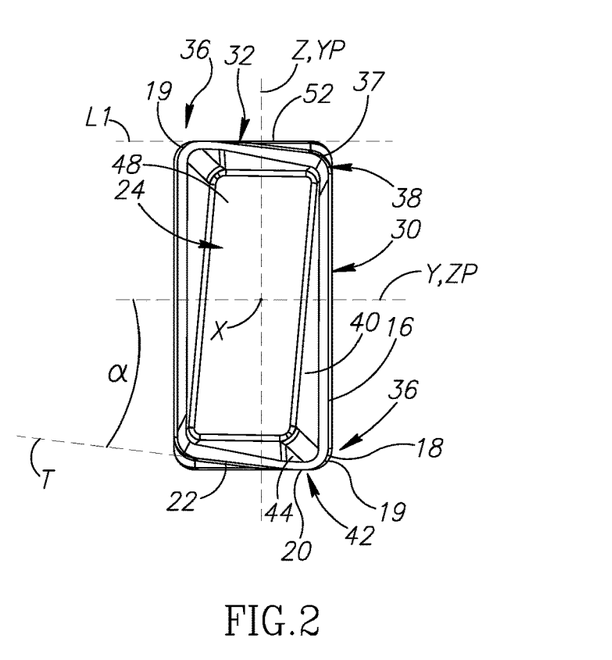
FIG. 2 is a plan view of a first surface of the ramping insert of FIG. 1.
Figure 3:
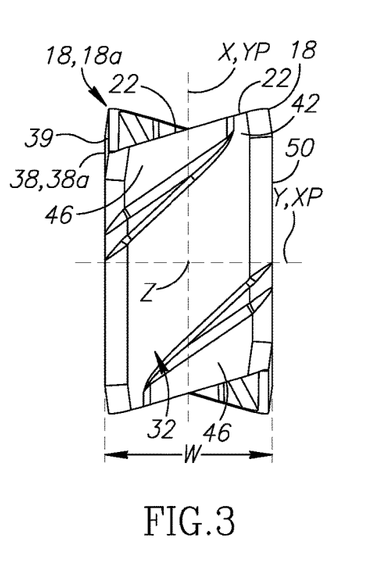
FIG. 3 is a plan view of a third surface of the ramping insert of FIG. 1.

The ramping insert 14 has exactly four cutting portions 36. Each first surface 24 has exactly two diagonally opposite cutting portions 36. Each cutting portion 36 includes four edges located on a respective peripheral edge 28 proximate a raised corner 18a. Namely, the major cutting edge 16; the wiper edge 20 which is connected to the major cutting edge 16 via a corner cutting edge 18; and a ramping cutting edge, or a ramping edge 22. Each corner cutting edge 18 has a cutting corner apex 19 which is the highest, or farthest portion, of the corner cutting edge 18 from the first median plane XP. The ramping edge 22 connects directly to, and extends transversely from (in a view parallel to the first axis X), the wiper edge 20. The wiper edges 20 and ramping edges 22 are not co-linear. The major cutting edge 16 is longer than the ramping edge 22. The ramping edge 22 is longer than the wiper edge 20. As seen in FIGS. 2 and 3, the ramping edges 22 extend on both sides of the second median plane YP. In some embodiments, the ramping edges 22 can extend along the second axis Y between 5 and 50% of the insert width W measured between the opposing second surfaces 30.

At its lowered corners 18a, each first surface 24 includes exactly two diagonally opposed minor corner edges 38, each of which extends between every two cutting portions 36. Every minor corner edge has a minor corner apex 37 which is the highest, or farthest portion of the minor corner edge 38 from the first median plane XP. The minor corner edges 38 are located closer to the first median plane XP than the corner cutting edges 18. The minor corner apexes 37 are located closer to the first median plane XP than the corner cutting apexes 19. Furthermore, on every first surface 24, the minor corner edges 38 are closer to the third median plane ZP than the corner cutting edge 18 (in a view parallel to the first axis X). Even further, on every first surface 24, the minor corner apexes 37 are closer to the third median plane ZP than the corner cutting apexes 17 (in a view parallel to the first axis X). On every first surface 24, each ramping edge 22 of one cutting portion 36 is connected to a major cutting edge 16 of an adjacent cutting portion 36 via a minor corner edge 38.

The major cutting edge 16, corner cutting edge 18 and ramping edge 22 are all sharp cutting edges configured for removing material from a workpiece. Contrary thereto, the wiper edge 20 is not configured to, and incapable of, removing material from a workpiece but rather to perform wiping and/or smoothing operations which improve workpiece surface quality. Furthermore, the minor corner edges 38 are also not configured for any type of machining, they are non-sharp and incapable of removing material from a workpiece.

Each major cutting edge 16 is formed at an intersection between each first surface 24 and second surface 30. Each second surface 30 has a major relief surface 39 which extends from the major cutting edge 16 towards the first median plane XP. Each first surface 24 has a major rake surface 40 which extends from the major cutting edge 16 towards the second median plane YP. Each major cutting edge 16 extends between a minor corner edge 38 and a corner cutting edge 18. As best seen in FIG. 4, in a view of the second surface 30 parallel to the second axis Y, the major cutting edge 16 is sloped in the direction of the first median plane XP, from a corner cutting edge 18 to an adjacent minor corner edge 38. Stated differently, the major cutting edge 16 extends transversely to the first median plane XP.

Each wiper edge 20 is formed at an intersection between the first and third surfaces 24, 32. The wiper edge 20 extends transversely to the major cutting edge 16. The corner cutting edge 18 connects the major cutting edge 16 with the wiper edge 20. Each third surface 32 has a wiper relief surface 42 which extends from the wiper edge 20 towards the first median plane XP. The wiper relief surface 42 can be perpendicular to the first median plane XP. As seen in FIG. 2, when viewing the ramping insert 14 from a view which is parallel to the first axis X, the wiper relief surface 42 can appear as a straight line. Each first surface 24 has a wiper surface 44 which extends from the wiper edge 20.

Each ramping edge 22 is also formed at an intersection between the first and third surfaces 24, 32. In a view parallel to the first axis X, the ramping edge 22 extends transversely from the wiper edge 20 and can form an acute ramping angle α with the third median plane ZP. In other words, when proceeding along the ramping edge 22 away from the wiper edge 20, the ramping edge 22 increases in proximity to the third median plane ZP. Stated generally, in a view parallel to the first axis X, a straight tangent line T which is tangent to any point of the ramping edge 22 forms the ramping angle α with the third median plane ZP. The ramping angle α receives α values between 0 and 20 degrees.

As seen in FIG. 3, each third surface 32 includes a ramping relief surface 46 which extends from the ramping edge 22 towards, but not beyond, the first median plane XP. The ramping relief surface 46 can be perpendicular to the first plane XP (as seen in FIGS. 3 and 4). Alternatively, the ramping relief surface 46 can form an acute internal ramping relief angle β with the third plane ZP (as seen in the cross section of FIG. 10). The wiper relief surface 42 and the ramping relief surface 46 are not co-planar.

This advantageous geometry can be described in terms of what is visible in certain views, especially FIGS. 1 and 2. For example—when viewing the ramping insert 14 from a view parallel to the first axis X, only the ramping relief surfaces 46 closer to the point of view (i.e., in the foreground in FIG. 2) are visible in said view. Another example—in said view, the ramping relief surfaces 46 located on the farthest side of the first median plane XP from the point of view are invisible. Furthermore, in the same view, every point of the third surfaces 32 located on the near side (i.e., foreground in FIG. 2) of the first median plane XP is either visible or coincides with a visible portion of the peripheral edge 28. Yet another example, in said view, each ramping edge 22 is at least partially spaced apart from an intersection line L1 between the first median plane XP and the third surface 32 (e.g., along the abutment surface 52 seen in FIG. 2 and described further below).

Due to the foregoing ramping relief surface geometry, the fact that each ramping relief surface 46 does not extend past the first plane XP, and that insert has non-positive geometry for all cutting edges, the insert may be pressed with a two-part die without forming undercuts on the green body (especially on the third surface 32). Also, each ramping relief surface 46 on this insert is a non-ground ramping relief surface, i.e., one whose shape is determined by pressing and sintering and without subsequent grinding. Such non-ground ramping relief surfaces generally have a surface roughness measurably greater than that of a ground surface.

The abovementioned restrictions which relate to the confinement of the ramping relief surface 46 to one side of the first plane XP is important at least because in a scenario where at least a portion of a die (designed to form the ramping relief surfaces 46 and any other geometry or sub-surface of the third surface 32 which is not necessarily parallel to the third plane ZP) extends beyond the die splitting line (or plane XP, which intersects said line) will inherently include unwanted geometries (such as corners), which can lead to the following form-pressing-related problems: (a) Hinder edge and surface accuracy; (b) Powder leaks (which may lead to grads/superfluous geometries); (c) Increased costs of die manufacturing; obstruct repeatability of die-sets matching; and (d) generally reduce process reliability.

Each first surface 24 can include a first abutment surface (FIGS. 1, 6 and 8) 48 which extends between the major rake surfaces 40. The first abutment surface 48 can be planar and oriented parallel to the first median plane XP (as seen in FIGS. 1 and 2). The first abutment surface 48 (FIGS. 6 and 8) can include two first abutment sub-surfaces 49 which converge outwardly away from the first median plane XP.

Each second surface 30 includes a second abutment surface 50 which extends between the major relief surfaces 39. The second abutment surface 50 can be planar and oriented parallel to the second median plane YP.

Each third surface 32 includes a third abutment surface 52 which extends between the second surfaces 30. The third abutment surface 52 can be planar and oriented parallel to the third median plane ZP. Each third abutment surface 52 can extend between the wiper relief surfaces 42. According some embodiments, each third abutment surface 52 and adjacent wiper relief surface 42 are co-planar. The third abutment surface 52 is always spaced apart from the ramping edges 22.

It is understood that each of the first, second and third abutment surfaces 48, 50, 52 may be ground, to enhance seating. However, as explained above, the ramping relief surface 46, which is on the same third surface 32 as the third abutment surface 52, may constitute a non-ground surface.

Attention is drawn to FIGS. 6-8. The ramping tool 10 can have an elongated body 54 or shank and rotates about a tool axis R. The ramping tool 10 has opposite coupling and machining ends 56, 58. According to some embodiments (e.g., as shown in FIGS. 6-8), the pockets 12 are tangentially arranged (as will be explained below) at the machining end 58 around the tool axis R.

Each pocket 12 has a second pocket abutment surface 60 and first and third pocket abutment surfaces 62, 64 which extend transversely to the second pocket abutment surface 60.

The second pocket abutment surface 60 has a female threaded screw hole 66 which opens out thereto for receiving a clamping screw 68. According to the current tangential example (FIG. 7), the second pocket abutment surface 60 faces away from the rotation axis R.

According to some 'right-hand' ramping tools (FIG. 8), the first pocket abutment surface 62 faces in a right-hand rotation direction and the third pocket abutment surface 64 faces in a direction parallel to the rotation axis R, away from the coupling end 56.

In an assembled position, the ramping insert 14 is seated in the pocket 12 and the clamping screw 68 is located within the clamping hole 34 and screw threaded in the screw hole 66 in the pocket 12. In the assembled position, the clamping and screw holes 34, 66 are eccentric which enables the screw (when tightened) to force the ramping insert 14 towards the first and third abutment walls.

In the assembled position, the first abutment surface 48 abuts the first pocket abutment surface 62, the second abutment surface 50 abuts the second pocket abutment surface 60 and the third abutment surface 52 abuts the third pocket abutment surface 64.

What is claimed is:
1. A double-sided, indexable, non-positive ramping insert (14) having a 180-degree rotational symmetry about each of the first, second and third axes (X, Y, Z) of a three-dimensional Euclidean space, a first median plane (XP) defined by the second and third axes (Y, Z), a second median plane (YP) defined by the first and third axes (X, Z) and a third median plane (ZP) defined by the first and second axes (X, Y), the ramping insert (14) comprising two first surfaces (24) located on opposite sides of the first median plane (XP), and an insert peripheral surface (26) extending between the first surfaces (24) and intersecting each first surface (24) at a peripheral edge (28), each first surface (24) comprising two raised corners (18a) and two lowered corners (38a), the raised corners (18a) being farther from the first median plane (XP) than the lowered corners (38a);

the insert peripheral surface (26) comprising two second surfaces (30) and two third surfaces (32) extending therebetween, each first surface (24) comprising exactly two opposite cutting portions (36), each cutting portion (36) comprising:

a major cutting edge (16) formed at an intersection of the first and second surfaces (24, 30);

a corner cutting edge (18) at one of the raised corners (18a), and a wiper edge (20) connected to the major cutting edge (16) via the corner cutting edge (18);

wherein, each cutting portion (36) further comprises a ramping edge (22) extending transversely from the wiper edge (20) in a view parallel to the first axis (X); and each third surface (32) comprises only two non-positive ramping relief surfaces (46), each ramping relief surface (46) extending from a respective ramping edge (22) towards, but not beyond, the first median plane (XP).

2. The ramping insert (14) according to claim 1, wherein on each first surface (24), each ramping edge (22) of a first cutting portion (36) is connected to a major cutting edge (16) of a second cutting portion (36) via a minor corner edge (38).

3. The ramping insert (14) according to claim 2, wherein, in a view parallel to the third axis (Z), in each peripheral edge (28), each minor corner edge (38) is located closer to the first median plane (XP) than any of the corner cutting edges (18).

4. The ramping insert (14) according to claim 2, wherein, in a view parallel to the first axis (X), on each first surface (24), the minor corner edges (38) are closer to the third median plane (ZP) than the corner cutting edges (18).

5. The ramping insert (14) according to claim 1, wherein in a view parallel to the first axis (X), the ramping edge (22) is at least partially spaced apart from an intersection line between the first median plane (XP) and the third surface (32).

6. The ramping insert (14) according to claim 1, wherein in a view parallel to the first axis (X), every point of the third surfaces (32) located on the near side of the first median plane (XP) is either visible or coincides with the peripheral edge (28) located on the near side.

7. The ramping insert (14) according to claim 1, wherein a clamping hole (34) extends between, and opens out to, either the first surfaces (24) or to the opposing second surfaces (30).

8. The ramping insert (14) according to claim 1, wherein each first surface (24) comprises a first abutment surface (48) which is parallel to the first median plane (XP).

9. The ramping insert (14) according to claim 1, wherein each first surface (24) comprises first abutment sub-surfaces (49) which are transverse to the first median plane (XP).

10. The ramping insert (14) according to claim 1, wherein each second surface (30) comprises a planar second abutment surface (50) which is parallel to the second median plane (YP).

11. The ramping insert (14) according to claim 1, wherein each third surface (32) comprises a planar third abutment surface (52) which is parallel to the third median plane (ZP).

12. The ramping insert (14) according to claim 1, wherein each second surface (30) comprises two major relief surfaces (39), each major relief surfaces (39) extending from an associated major cutting edge (16), transversely to the second median plane (YP).

13. The ramping insert (14) according to claim 1, wherein each third surface (32) comprises two wiper relief surfaces (42), each of which extends from an associated wiper edge (20) towards, but does not extend past, the first median plane (XP).

14. The ramping insert (14) according to claim 13, further comprising a third abutment surface (52) which extends between the wiper relief surfaces (42).

15. The ramping insert (14) according to claim 1, wherein each ramping relief surface (46) is either perpendicular to, or forms an acute internal ramping relief angle ((3) with, the third median plane (ZP).

16. The ramping insert (14) according to claim 1, wherein: each third surface (32) comprises wiper relief surfaces (42) which extend towards the first median plane (XP) from respective wiper edges; and wherein the wiper relief surface (42) and the ramping relief surface (46) belonging to the same third surface (32) are not co-planar.

17. The ramping insert (14) according to claim 1, wherein in a view parallel to the first axis (X) when proceeding along the ramping edge (22) starting from the wiper edge (20), each successive point is located closer to the third median plane (ZP) than the one before it.

18. The ramping insert (14) according to claim 1, wherein in a view parallel to the first axis (X), the ramping edge (22) appears straight and forms an acute ramping angle (a) with the third median plane (ZP).

19. The ramping insert (14) according to claim 1, wherein the ramping edge (22) is continuous.

20. The ramping insert (14) according to claim 1, wherein in any cross section of any one of the third surfaces (32) taken parallel to the second median plane (YP), when proceeding along said one third surface (32) away from the first median plane (XP), each successive point is located either at the same distance from, or closer to, the third median plane (ZP), with respect to a point before it.

21. The ramping insert (14) according to claim 1, wherein in any cross section of any one of the second surfaces (30) taken parallel to the third median plane (ZP), when proceeding along said one second surface (30) away from the first median plane (XP), each successive point is located either at the same distance from, or closer to, the second median plane (YP) with respect to a point before it.

22. The ramping insert (14) according to claim 1, wherein the major cutting edge (16) is longer than the ramping edge (22) and the ramping edge (22) is longer than wiper edge (20).

23. The ramping insert (14) according to claim 1, wherein the ramping insert (14) has at least a 180-degree cutting edge rotational symmetry, with respect to all three of the first, second and third axes (X, Y, Z).

24. The ramping insert (14) according to claim 23, wherein the rotational symmetry does not relate to non-functional geometry.

25. The ramping insert (14) according to claim 23, wherein the rotational symmetry does not relate to chip breaking or deflecting surfaces.

26. The ramping insert (14) according to claim 1, wherein the ramping insert (14) is configured for milling an exactly 90 degree shoulder in a workpiece.

27. The ramping insert (14) according to claim 1, wherein in a view parallel to the first axis (X), a straight tangent line (T) which is tangent to any point of the ramping edge (22) forms an acute ramping angle (a) smaller than 20 degrees, with the third median plane (ZP).

28. The ramping insert (14) according to claim 1, wherein when proceeding along the ramping edge (22) away from the wiper edge (20), the ramping edge (22) increases in proximity to the first median plane (XP).

29. The ramping insert (14) according to claim 1, wherein the ramping relief surfaces (46) constitute non-ground surfaces.

30. A ramping tool (10) having opposite machining and coupling ends (56, 58), wherein the machining end (56) comprises at least one pocket (12) having a ramping insert (14) according to claim 1 retained therein.

31. The ramping tool (10) according to claim 30, wherein the at least one pocket (12) comprises:
a second pocket abutment surface (60) with a threaded screw hole (66) which opens out thereto;

first and third pocket abutment surfaces (62, 64) extending transversely away from the first pocket abutment (60) surface; and a clamping screw (68) configured to clamp the ramping insert (14) in the pocket (12).

32. The ramping tool (10) according to claim 31, wherein: in the cutting insert:

each first surface (24) comprises a planar first abutment sub-surface (49) which is transverse to the first median plane (XP), each second surface (30) comprises a planar second abutment surface (50) which is parallel to the second median plane (YP), each third surface (32) comprises a planar third abutment surface (52) which is parallel to the third median plane (ZP), and a clamping hole (34) extends between, and opens out to, either the opposing first surfaces (24) or to the opposing second surfaces (30), the insert's first abutment surface (48) abuts the first pocket abutment surface (62), the insert's second abutment surface (50) abuts the second pocket abutment surface (60) and the insert's third abutment surface (52) abuts the third pocket abutment surface (64); and the clamping screw (68) is screw threaded in the screw hole (66) and located in the clamping bore (34).

33. A double-sided, indexable, non-positive ramping insert (14) having a 180-degree rotational symmetry about each of the first, second and third axes (X, Y, Z) of a three-dimensional Euclidean space, a first median plane (XP) defined by the second and third axes (Y, Z), a second median plane (YP) defined by the first and third axes (X, Z) and a third median plane (ZP) defined by the first and second axes (X, Y), the ramping insert (14) comprising two first surfaces (24) located on opposite sides of the first median plane (XP), and an insert peripheral surface (26) extending between the first surfaces (24) and intersecting each first surface (24) at a peripheral edge (28), each first surface (24) comprising two raised corners (18a) and two lowered corners (38a), the raised corners (18a) being farther from the first median plane (XP) than the lowered corners (38a);

the insert peripheral surface (26) comprising two second surfaces (30) and two third surfaces (32) extending therebetween, each first surface (24) comprising exactly two opposite cutting portions (36), each cutting portion (36) comprising:

a major cutting edge (16) formed at an intersection of the first and second surfaces (24, 30);

a corner cutting edge (18); and a wiper edge (20) connected transversely to the major cutting edge (16) via the corner cutting edge (18);

wherein, each cutting portion (36) further comprises a ramping edge (22) extending transversely from the wiper edge (20) in a view parallel to the first axis (X); and wherein in any cross section of any one of the third surfaces (32) taken parallel to the second median plane (YP), when proceeding along said one third surface (32) away from the first median plane (XP), each successive point is located either at the same distance from, or closer to, the third median plane (ZP) with respect to a point before it.

34. The ramping insert (14) according to claim 33, wherein each ramping edge (22) has an associated non-ground ramping relief surface (46) formed in the third surface (32).

* * * * *